United States Patent [19]

Le Van Suu

[11] Patent Number: 5,535,344
[45] Date of Patent: Jul. 9, 1996

[54] DEVICE FOR THE CONNECTION OF AN APPARATUS TO A TRANSMISSION CHANNEL

[75] Inventor: Maurice G. Le Van Suu, Romainville, France

[73] Assignee: SGS-Thomson Microelectronics, S.A., France

[21] Appl. No.: 164,890

[22] Filed: Dec. 8, 1993

[30] Foreign Application Priority Data

Dec. 14, 1992 [FR] France ................................. 92-15039

[51] Int. Cl.⁶ ................................................. H04J 3/02
[52] U.S. Cl. ........................ 395/309; 395/200.2; 395/311
[58] Field of Search .................................. 370/85.5, 85.2; 395/325, 200.2

[56] References Cited

U.S. PATENT DOCUMENTS 5,305,317  4/1994  Szczepanek ............................ 370/85.5

OTHER PUBLICATIONS

A Flexible Communications Controller Through VLSI, Logan et al., pp. 5–8, Wescon/82, Electronics Snow & Convention/Sep. 14–16.

Mini Micro Conference Record, 1983, US, pp. 1–18: V. Coleman, et. al. "The Implementation of Ethernet/IEEE 802.3 in VLSI".

Interfaces in Computing, 1985, Switzerland, 173–187: R. W. Dobinson et. al. "Interfacing to Ethernet Using VLSI Protocol Chips".

Primary Examiner—Jack B. Harvey
Assistant Examiner—Jeffrey K. Seto
Attorney, Agent, or Firm—Robert Groover; Betty Formby

[57] ABSTRACT

To connect an apparatus to a transmission channel, use is made of a device comprising a first coupling circuit to couple the device to the channel, a second circuit to process the signals received or transmitted and to verify that they conform to a pre-set standard, and a third circuit, normally a microprocessor, connected firstly to the processing circuit and secondly to the apparatus to make it carry out instructions corresponding to the information elements received. The second circuit comprises a control register associated with the type of the signals transmitted and a buffer memory to receive the signals transmitted or to be transmitted. The microprocessor is then made to carry out the instructions loaded into a program memory of this microprocessor as a function of the state of this control register.

42 Claims, 7 Drawing Sheets

DEVICE FOR THE CONNECTION OF AN APPARATUS TO A TRANSMISSION CHANNEL

BACKGROUND OF THE INVENTION

1. Field of the Invention

An object of the invention is a device for the connection of an apparatus or appliance to a transmission channel that can be used in the field of home automation. The object of this field, which has a very promising future, is the interconnection, within a dwelling, of the various items of apparatus and appliances that use electricity so that their use can be managed as efficiently as possibly. These items of apparatus and appliances include central heating installations (for example those using electricity or hot water) and installations for the reception of radio broadcasts and communications installations as well as various domestic electrical appliances, notably freezers and washing machines. They may also include surveillance installations and fire or burglary alarms.

Experts studying these questions of home automation links have together and set up a standard governing the conditions under which signals, data elements or commands have to be transmitted. To this end, they have defined the following five transmission channels: transmission by carrier current, transmission by infrared radiation, radioelectric transmission, transmission by twisted pairs and transmission by coaxial cable. For each transmission channel, the standard defines the link physically as well as temporally. This means that the recognition signals, when a communication is set up, must follow to particular protocols of transmission and reception. Furthermore, in each channel, there is provision for transmission speeds that may vary, the low speeds being usable especially when the transmission channel is not a high-quality channel, i.e. especially when it is noise-ridden.

The items of apparatus that are designed to be connected to installations such as these are provided, by virtue of their principle, with a microprocessor or microcircuit capable of making the apparatus carry out instructions that have been transmitted to it by the channel or conversely of sending the channel indications, intended for an alarm station, on the efficient operation of the apparatus. Among the possible uses, it is possible to conceive of a case, for example, where electrical heating installations may be installations with time-delayed starting. This would be done at the initiative of the electricity supplier (a electricity production utility firm) in order to limit the magnitude of the drawing of current. There are instances when electrical power stations would find it difficult to cope with substantial drawing of current, as for example during a television broadcast when all the inhabitants of a region or even of a country start consuming power. Since the time taken to start up a power station is about half an hour, it would be possible notably with such installations to spread out the drawing of current so that it corresponds to the power build-up time of the power station. Thus, a microprocessor such as this, managing a heating installation in a house, would start up the heating and consequently the consumption of electrical power only during a time-slot with a preferential tarif or following a predetermined command from an electrical mains system.

For a system such as this to be usable, the devices for the connection of the appliances and items of apparatus to the transmission channel should meet these standards.

2. Description of the Prior Art

This has led to the making, initially, of wired circuits enabling the microprocessor of the apparatus to be coupled to the transmission channel. In view of the diversity of the microprocessors that can be used, as well as the large number and diversity of transmission channels possible (five channels not counting the cases of speed matching as well as the type of coding of the data signals), the development of this industry is hampered by the fact that it is complicated to implement.

In an attempt to overcome this drawback, a first French patent application No. 92 05423 filed on 30 April 1992 by the present applicant has devised a connection circuit using the microprocessor of the apparatus in such a way that, in addition to the instructions imposed on the apparatus, the microprocessor is capable of bringing about the execution of the instructions for the configuration of the connection so as to match the channel. This approach has had the merit of eliminating the presence of wired circuits, the operation of which was excessively related to the conditions of use and the development of which entailed a laborious process. At the same time, this approach has had one drawback: it requires all apparatus designers to have knowledge of the connection standard so that, in the microprocessor of their apparatus, they provide for a set of instructions appropriate to the setting up of the connection between the apparatus and the channel. This is unfortunately difficult to implement, especially at the present time when this industry is in the process of being established and when this standard is little known. This standard is a complex one: its contents, brought together in one document, take up as much space as a good-sized dictionary.

Notably, the problem in the foregoing approach that was conceived of arises out of the fact that the use of the apparatus and the connection protocol are done by one and the same microprocessor. Consequently, this makes it necessary to store a programme of instructions pertaining to this protocol and to the use in the memory of this microprocessor. Now, the location of the instruction pertaining to this protocol in the use to which the client puts the system is not known a priori and this makes it necessary, therefore, either that the customer should know the standard or that the customer should get his mode of use programmed by the designer of the channel connection device, which is a very cumbersome process.

Furthermore, in managing both the protocol and the use, the microprocessor of the apparatus performs less well than if it were to manage only one of the two tasks.

The standard stipulates, for a carrier current link, a speed of 2400 bauds with 66 bytes per frame in nominal mode. In a link using twisted pairs, the transmission speed is equal to 9600 bauds at 1.5 Mbits with 256 bytes per frame. With an infrared link, there is provision for 1200 bauds or 2400 bauds and 6 to 256 bytes per frame respectively while in RF links the transmission speed is in the range of 1 megabit per second.

The fact that a microprocessor is capable of managing such a diversity of protocols, given that these microprocessors also have to operate the appliance connected to the channel, entails a cost of about fifty French francs per unit for the connection device, even for production in large quantities whereas a low-cost (three or four francs) microprocessor would suffice to make the apparatus work. This approach can therefore be envisaged only for large machines or large installations. It is not feasible, for example, for an installation for a wall socket for electrical current.

It is an object of the invention to overcome these drawbacks, i.e. to make the standard transparent to users while at the same time also reducing the cost of the connection point. According to the invention, this problem is resolved by the use of a wired circuit connected, first, to the channel and, second, to the microprocessor. The difference between this wired circuit and prior existing ones is that it is programmable. In a connection device such as this, the principle of the programming of this wired circuit consists in providing for two intermediate registers in the. A first register is designed for control signals and a second register is designed for data elements. Each of these registers comprises a part called a transmission part and a part called a reception part, although these parts may be physically one and the same.

During transmission, a part of each of these registers is written, i.e. its cells are programmed, by the microprocessor of the appliance. Then, these cells are read by a circuit connected to the transmission channel. Conversely, for reception, the cells of these intermediate registers are written by a circuit connected to the transmission channel and are then read by the microprocessor. Seen from the apparatus side, the management of these registers (reading or writing) is simple since it uses a common technique for the reading and writing of computer type registers. Seen from the transmission channel side, the wired nature of the system enables it to take charge of all the difficulties of matching related to the transmission or reception of the information elements between the channel and the device.

The particular feature of the intermediate register moreover is that it provides adaptability for the connection device: notably, it enables it to achieve self-configuration in transmission speed for example, or in encoding mode (with even parity or odd parity or in any other mode). Given the various situations in which the wired circuit of the invention may be placed, it is realized that, in reception mode, when a message has been received, the external microprocessor will be required only to read the contents of this message in the data register and, when this message has been read, to report on the fact that it has been read. In transmission mode, the microprocessor of the apparatus will be required only to provide the device with information on the addressee of the transmission as well as on the contents of the message to be transmitted. From this viewpoint, the constraints of the standard disappear totally for the designer of an apparatus. Consequently, the microprocessor to be implemented in this apparatus may be very simple and its cost may be very low, for example three or four francs. As a result of this procedure, the standard is completely transparent to the user. He complies with it without knowing that he is doing so.

SUMMARY OF THE INVENTION

An object of the invention, therefore, is a device for the connection of an apparatus to a signal transmission channel comprising:

a first coupling circuit to couple the device to the channel in reception and in transmission;

a second circuit, connected to the first circuit, to process bits received or sent and to check the conformity of the signals received or sent with a pre-set standard; and a third circuit connected to the second circuit and to the apparatus, to manage transmitted signals as a function of a use proper to the apparatus; wherein the second circuit comprises a control register associated with the type of the signals transmitted or to be transmitted, and a buffer memory to receive the signals transmitted or to be transmitted, and wherein the third circuit comprises a microprocessor carrying out, on the signals transmitted or to be transmitted, instructions loaded into a program memory of this microprocessor as a function of the state of this control register.

BRIEF DESCRIPTION OF THE DRAWINGS

The invention will be understood more clearly from the following description and from the appended figures. These are given purely by way of a description and in no way restrict the scope of the invention. Of these figures.

MORE DETAILED DESCRIPTION

Figure 1:
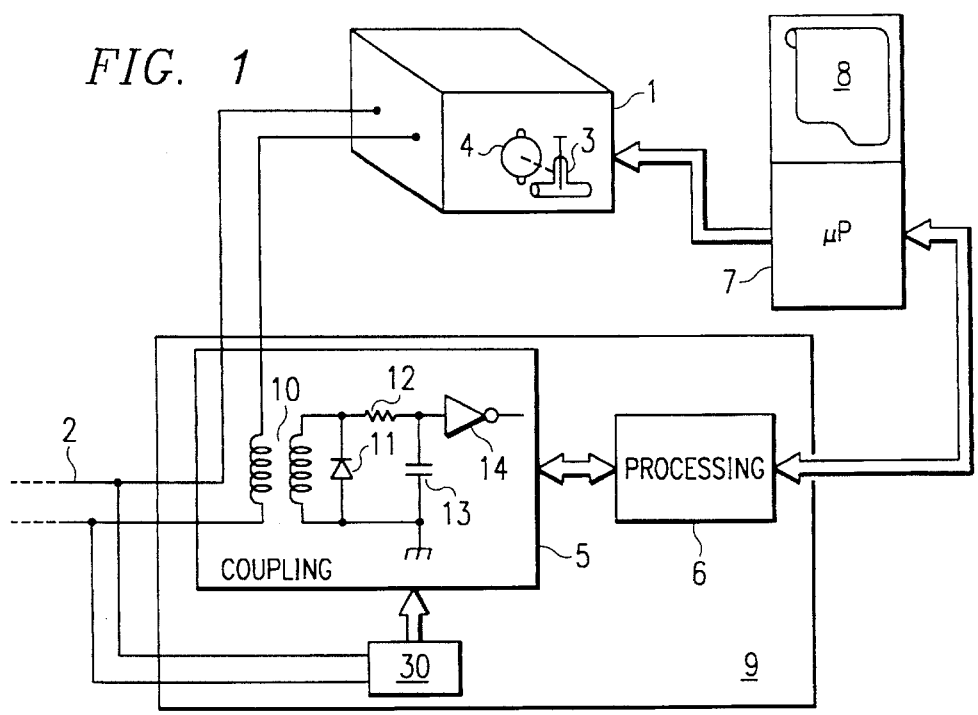
FIG. 1 shows a schematic view of a connection device according to an embodiment of the invention.

FIG. 1 shows an electrical apparatus 1 connected to a signal transmission channel 2. In one example, the channel 2 is a carrier current link, but it could be any one of the links mentioned here above. The apparatus 1 comprises, in brief, a solenoid valve 3 operated by a motor 4 or, as a variant, any measuring device. The connection device of the invention comprises a first coupling circuit 5 to couple the device to the channel 2 in reception and in transmission. It will be seen below that the circuit 5, in certain cases, is also used to shape signals to give them a binary form. This circuit 5 is a circuit known in the prior art. It sends digital signals to the apparatus 1 or receives digital signals from the apparatus 1. The connection device the invention also has a second processing circuit which is connected, first, to the first circuit 5 and second, to a third circuit 7. The second circuit 6 used to process the bits received or sent and is used to ascertain that the signals received conform to the pre-set standard or to shape the signals that are sent The third circuit 7 is also connected to the apparatus 1. This third circuit 7 is incorporated into the apparatus 1. The third circuit 7 is a microprocessor and controls the motor 4 of the apparatus 1. The microprocessor 7 has a programmed memory 8 which contains the instructions carried out by the microprocessor 7.

The apparatus 1 may include a microprocessor 7 or an equivalent element. For example, the connection device of the invention will preferably comprise two connection cards: a first card 9 comprising the first coupling circuit 5 and the second processing circuit 6, and a second card comprising the microprocessor 7. In the electronic card 9, the coupling circuit 5 could be replaced by a coupling circuit proper to the channel used. Given that there are five existing channels, there will therefore be five variants of the card 9, possibly more if other standardized channels prove to be useful in the future.

Before going any further with the explanation of the device of the invention, we shall explain how, in one example, a part of the processing of the received signals is carried out. In the coupling circuit 5, there is provision for a detection circuit that herein comprises, in brief, a transformer 10, a diode 11 in parallel with the secondary winding of the transformer 10 and an RC circuit, respectively 12 and 13, in parallel with the diode. This detection circuit makes it possible to detect the presence or absence of a RF pulse transmitted by the mains line 2. An inverter 14, connected to the midpoint of the RC circuit 12, 13 makes it possible to have signals transmitted by the channel 2 available in binary form. The working of the circuit 5 is such that the time constant of the RC circuit is intermediate between the frequency of the RF signal and that of the mains. Should the binary mode be a dual frequency mode, an assembly of the same type is used but with, in addition, filters with switched capacitances.

Figure 3A:
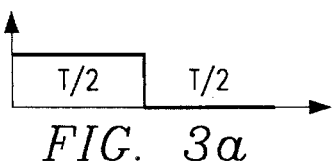
FIGS. 3a and 3b show the shape of the binary signals to be received, coming from the channel.
Figure 3B:
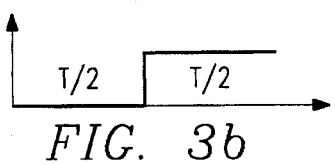

FIGS. 3a and 3d show the shape of these signals when they respectively represent a 1 or a 0. If the start of the signal is identified, a 1 takes the form of a descending transition that occurs at approximately half of the duration assigned to the transmission of the bit. By contrast, a 0 takes the form of a rising transition.

The processing operations that have to be carried out are designed to show, firstly, that an accurate 1 or 0 has been received (that the transition has occurred at the right time) and, secondly, that at no time has the line carried two simultaneous transmissions coming from different sources. What has to be done is to carry out a collision test. Indeed, if two instruments use one and the same transmission line at the same time, their signals will be received together by all the items of apparatus. This will garble the reception.

Figure 2:
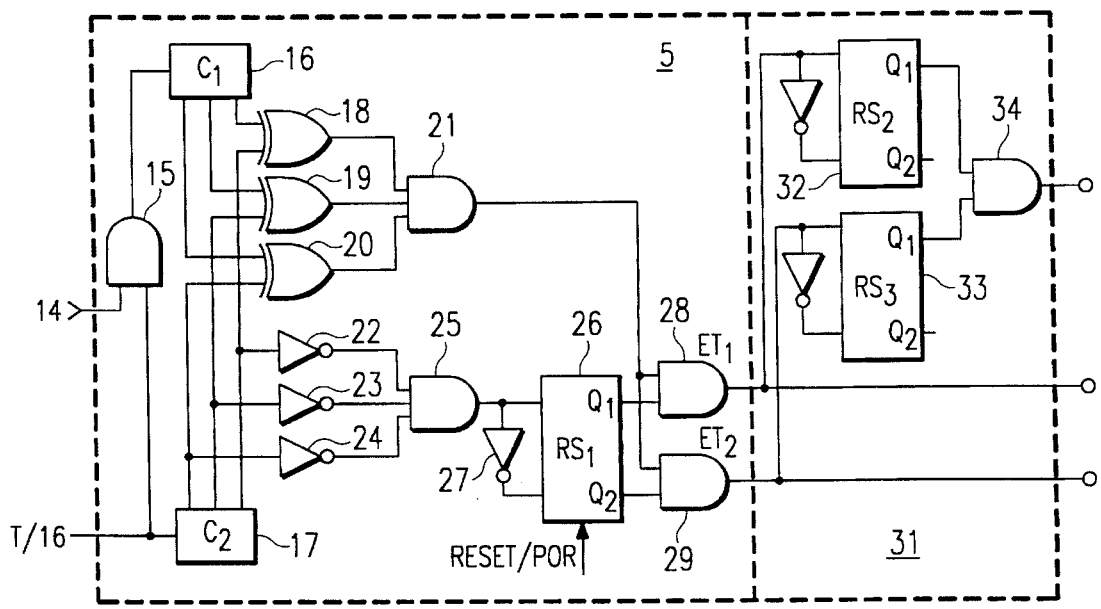
FIG. 2 shows a part of a processing operation for detection, bit control and collision control used in the second circuit of the invention.

The principle of the detection and of the control is of the bits as well as that of the collision control shown in FIG. 2. However, other principles of detection could be adopted, the one that shall be described being a practical one but not essential to the invention. It works as follows. The digital signal received in the coupling circuit 5 is transmitted, at the same time as a clock signal, to an AND gate 15 of this circuit 5. In one example, the clock signal has sixteen clock pulses per standardized duration T of bits received. This duration is fixed by the transmission speed accepted for the channel 2. The AND gate 15 therefore carries out a sampling of the binary signal received which is thus normally split up into eight samples at 1 followed by eight samples at 0 if a 1 is to be received, or the reverse if a 0 is to be received. The AND gate 15 is connected to a first counter C1 16 which is a three-bit counter. In practice, this counter 16 is constituted, for example, by a succession of three cascade-mounted RS flip-flops. Having three outputs, this counter has, at its three outputs, all the successive binary states existing between 000 and 111 before it is reset at 000 and starts again.

In the same period of time as the signal 14 coming from the inverter is sent in this way to the counter C1 (16), the clock signal itself is transmitted to a second counter C2 (17). The counter C2 (17) is identical to the counter C1. The counter C2 counts and delivers output states, changing between 000 and 111, at its three outputs and then starts again. The outputs of these counters 16 and 17 are connected to the respective inputs of three exclusive-OR gates 18 to 20. Each of the exclusive-OR gates 18 to 20 delivers, at output, a signal equal to 1 if the signals introduced at their inputs are identical, and signals equal to 0 as soon as there is a difference.

Consequently, when a 1 is received, the first eight samples at 1 of the signal counted down by the counter C1 (16) get combined with the eight clock samples counted down by the counter C2 (17) to produce, at output of the gates 18 to 20, states 1 that are held. The gates 18 to 20 are connected to the inputs of an AND gate 21 with three inputs. Under these conditions, the AND gate 21 delivers a signal 1 during the first part of the reception of a 1. It subsequently delivers a 0. The three outputs of the counter C2 (17) are connected by three inverters 22 to 24 to the three inputs of an AND gate 25. Since the counter C2 (17) counts from 000 to 111, the signals at the input of the gate 25 evolve from 111 to 000. In other words, the output of the gate 25 delivers a pulse only one in every eight times: when there is the transition. The AND gate 25 is connected to an input of an flip-flop RS1 26. The other input of this flip-flop RS1 26 is connected to the output of the gate 25 by means of an inverter 27. During normal operation, the output signal Q1 of the flip-flop RS1 26 goes to 1 while the output Q2 goes to 0. The output signal of the AND gate 21 is introduced to each of the inputs of two AND gates, 28 and 29 respectively. The AND gates 28 and 29 furthermore receive, respectively, the signals of the outputs Q1 and Q2 of the flip-flop RS1 26. Consequently, the AND gate 28 delivers, at output, a signal equal to 1 during the first half-period of the reception of the bit and a signal equal to 0 during the second half period: it is the site of a negative transition. By contrast, the output of the gate 29 remains always at zero. When a zero is to be received, the reverse operation takes place, with the gate 29 delivering a rising transition at the instant of the transition of the bit 0. To organize the synchronization of the flip-flop RS1 26 as well as that of other circuits of the device of the invention, these circuits receive a resetting signal POR (POWER ON RESET) at a resetting input when the power is turned on. This signal POR is produced, for example, by a circuit 30 (FIG. 1) of a known type also coupled to the transmission channel.

When there is a collision, i.e. when, in practice, two times eight samples at 1 are received, this anomaly is detected as follows. A collision control circuit 31 has two flip-flops, RS2 and RS3, respectively 32 and 33, connected to the outputs of the AND gates 28 and 29. The flip-flop RS2 32 and the flip-flop RS3 33 are mounted in the same way as the flip-flop 26 with an inverter between their two inputs. The outputs Q1 of each of these flip-flops 32 and 33 are connected to an AND gate 34. In the first half-period, the flip-flop RS2 32, which has gone up to 1, remains at 1 while the flip-flop RS3 33 goes to 1 at the second half-period and also stays at 1. In this case, the AND gate 34 delivers a 1 that indicates a collision. Other circuits for the processing and quality control of the bit and for collision control can be envisaged, the aim being to have, firstly, transmitted signals and, secondly, a signal indicating the presence or absence of a collision as well as a signal indicating the right quality of the bit if the transition takes place at the right time. The circuit 5 therefore truly carries out the analog/digital conversion as well as the delivering of the bit control and collision signals. In transmission, the operation is similar.

Figure 4A:
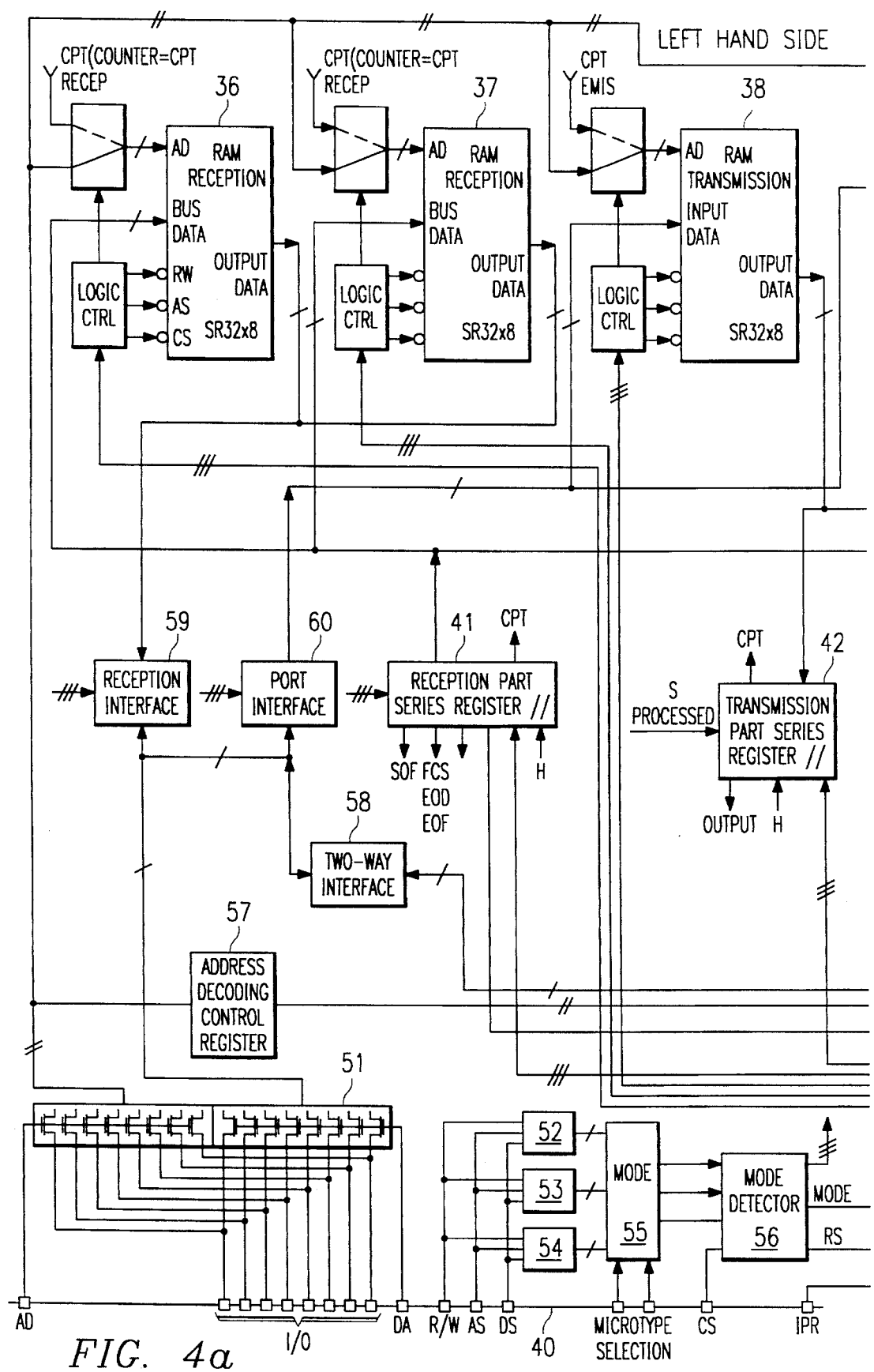
FIGS. 4a and 4b show a general diagram of the circuit of the invention with its interface for connection to the microprocessor of the apparatus.
Figure 4B:
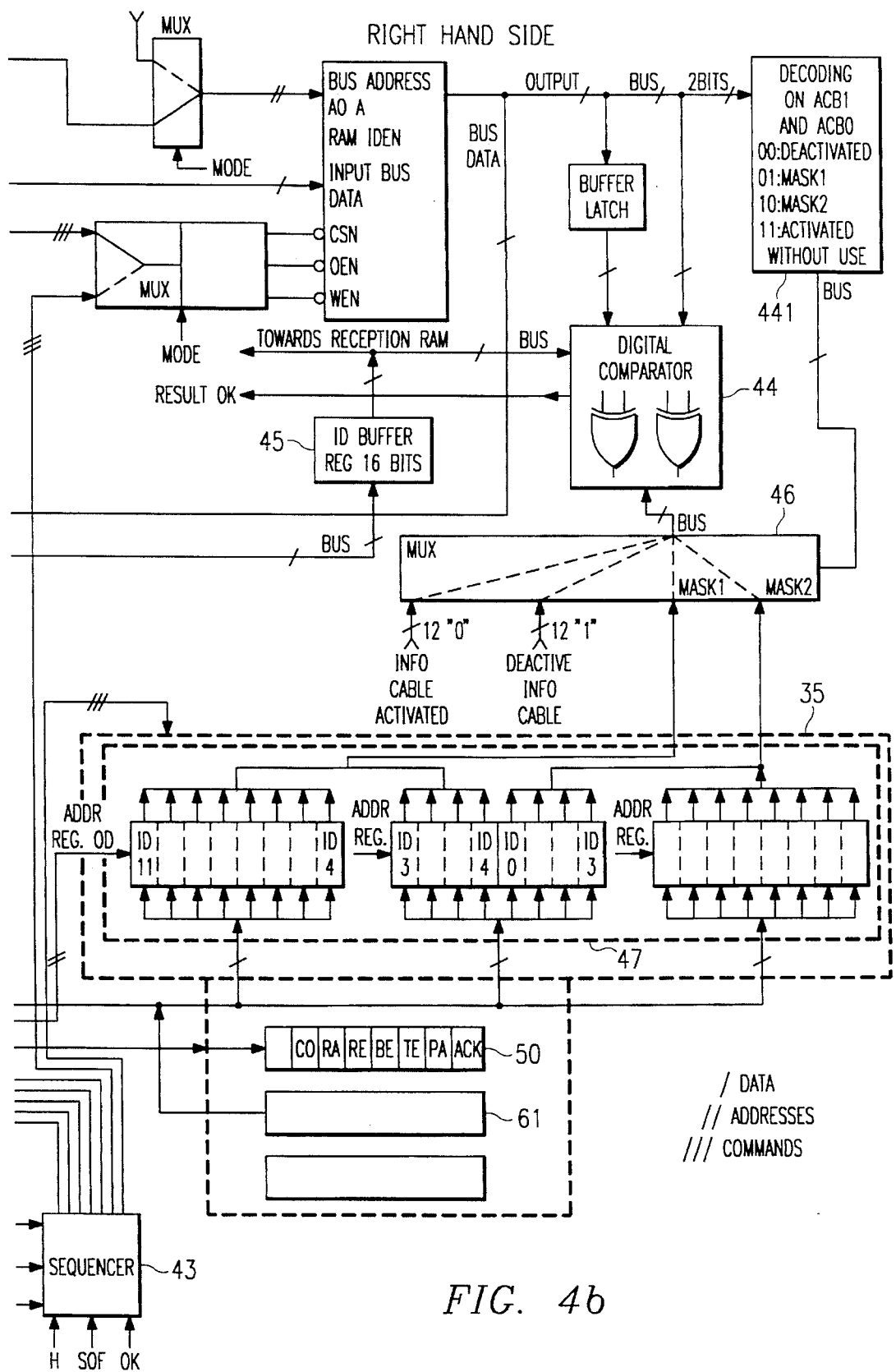

FIGS. 4a and 4b show the general diagram, in the processing circuit 6, of the specific circuits of the invention. This circuit essentially comprises a control register 35 and a buffer memory, represented herein by the random-access memories 36 to 39. The buffer memory has a reception zone constituted herein by the two memory blocks 36 and 37. In one example, each of them is capable of storing 32 bytes. The buffer memory also has a transmission part constituted herein also by 32 bytes stored in the block 38. Finally, the buffer memory also has an identification zone: the block 39, with the same capacity, the memory cells of which are programmed, in initialization, with data elements coming from the microprocessor 7. The contents of the memory cells of the memory 39 are used by the second circuit, subsequently, as a function of a management proper to this second circuit.

The circuit of FIGS. 4a and 4b has a interface 40 for connection with the microprocessor 7 of the apparatus 1. To communicate with the coupling circuit 5, it has a reception part 41 and a transmission part 42 whose essential function is to convert the received signals or the signals to be transmitted, from a serial form into a parallel form or vice versa. The circuits 41 or 42 are essentially series-parallel converters or parallel-series converters, the operation of which is controlled by a sequencer circuit 43. The sequencer circuit 43 receives a clock signal H as well as inter alia a mode selection signal whose operation will be known hereinafter.

A number of links are shown in the circuit of FIGS. 4a and 4b. These links are crossed with one stroke, two strokes or three strokes, to represent, respectively, data buses, address buses or control buses. The mode selection is related to the character of the link, i.e. whether it is intended for transmission or for reception. The control register and the buffer memories referred to here above are capable, in one mode, of being written (programmed) by the microprocessor 7, in which case the data, address and control buses are controlled by the microprocessor 7. Alternatively, in another mode, they may be written at the initiative of the sequencer circuit 43, in which case these buses are managed by the sequencer circuit 43. This is also true for the reading.

For reception, the procedure takes place as follows. The signal received at output of the circuit 5 arrives in series at one input of the reception circuit 41. From there, it is transmitted in parallel by the data bus, firstly to the reception memories 36 and 37 and, secondly, towards a digital comparator 44, the aim of which is to compare the identification of the signal received with an identification that is loaded beforehand into the memory 39. This comparison makes it possible to ascertain that the circuit of FIGS. 4a and 4b is truly the addressee of the information elements transmitted by the channel 2. In normal times, during a standby situation, the sequencer 43 is, for example, configured in reception mode: it has control over the internal command, address and data buses. The received signal has, at the start, a header. This header is interpreted in a known way, in the circuit 41, as a start-of-frame signal called SOF. To this end, the circuit 41 comprises a decoder capable of producing an SOF command when it receives a binary sequence representing a start of a frame. The signal SOF is used to implement a particular sequence of the sequencer 43. In this sequence, the sequencer prompts, firstly, the storage, in the buffer register 45, of the 16 identification bits received. At the same time, it also prompts the scrutinizing of the random-access memory 39, pair of bytes by pair of bytes. Normally, an identification is formed on 12 bits. It may have a length of more than 12 bits. This means that there normally remain four bits available. It is also possible to use a following word for a masking.

In the invention, use is also made inter alia of two bits of these four available bits for the storage, in association with the identification of the apparatus 1, of the prerequisite conditions of reception of the signals intended for this apparatus. These two bits are sent to a decoding circuit 441 connected to a multiplexer 46. The circuit 441 is, in practice, a memory circuit with two inputs and two outputs. These two bits can nevertheless be used directly and can be sent by the multiplexer 46. The multiplexer 46 is connected firstly with the digital comparator 44 and, secondly, with a masking register 47 comprising, for example, two masks 48 and 49. A mask is a succession of 12 bits.

The purpose of the digital comparator is to compare the identification contained in the identification memory 39 with the temporary identification received and stored in the buffer register 45, under the conditions dictated by a masking given by the multiplexer 46. The object of the masking is to enable the reception of information elements if the bit-to-bit comparison between the received identification and the memorized identification is totally successful, partially successful at a first level, or partially successful at a second level. Alternatively, by contrast, the object of the masking is to accept the signals independently of any knowledge of whether the circuit is the addressee or not.

In practice, the comparator 44 has exclusive-OR gates receiving, firstly, the memorized identification and, secondly, the received identification. These exclusive-OR gates are each connected to an AND gate to which there is connected one of the masking bits chosen after the decoding. For 12-bit identifications, there are therefore twelve AND gates.

When the comparison is made successfully, the comparator 44 delivers a signal OK received by the sequencer 43. This leads to the launching of the sequence of the operations of this sequencer 43. In practice, the comparison is immediate. The data elements received in the frame are then directed by the sequencer 43, from the circuit 41, towards the buffer memories 36 and 37. As and when the bits arrive, they are written, as a function of commands transmitted by the control bus, in these buffer memories at addresses incremented as a function of the output signal CPT of a counter that depends directly on this reception part 41: thus efficient synchronization is ensured. Then the reception of the signals of the frame continues with the reception of a signal called FCS (Frame Control Sequence). The sequencer can furthermore carry out a recomputation, on the basis of the received data, of a signal analogous to the signal FCS. The two signals are compared. In the event of difference, it is determined that there is a frame error. The frame error information is recorded in the reception control register. If necessary, the frame has an acknowledgment request signal DACK that requires the circuit of FIGS. 4a and 4b to send back an reception acknowledgment signal RACK on the channel 2. After this acknowledgment of reception, the circuit of FIGS. 4a and 4b finally receives an end-of-frame signal EOF. The states of all the signals, SOF, OK, FCS, DACK, RACK, EOF, are stored in a received status register 50, at the same time as the collision detection and parity check signals if any. At the time of the reception, the register 50 is written at the initiative of the sequencer 43 which drives the control bus of the control register 35.

The reception of the signal EOF prompts the dispatch, by the sequencer 43, of an interrupt signal intended for the microprocessor 7 of the apparatus 1. This apparatus will therefore have to read the contents of the memories 36, 37 and interpret them upon examination of the contents of the received status register 50.

To do this, the microprocessor 7 is connected by the interface 40 to the circuit of the FIGS. 4a and 4b, by an input/output bus I/O that can be used alternately as a data bus and address bus. This alternating use is prompted by means of a multiplexer 51 receiving two control signals: the signals AD and DA. The signal AD, when in the active state, giving rise to a signal DA in the inactive state, converts the input/output interface into an address exchange interface. If this is not the case, the input/output interface becomes a data exchange interface. The multiplexer 51 simply contains batteries of transistors series-mounted between these inputs and the wires of data and address buses of the circuit of FIG. 4. The transistors respectively receive the signals AD or DA at their control gate.

The control signals, generally called RW, AS, DS or read/write, address validation and data validation signals respectively are admitted to specific inputs of the interface 40. They are transcoded by transcoding circuits 52 to 54, the aim of which is to match these control signals, proper to the microprocessor 7, with the control signals understood by the circuit of FIGS. 4a and 4b. The circuits 52 to 54 are very simple since there are only these three signals to be decoded. The transcoders 52 to 54 are connected to a multiplexer 55 enabling the selection of that one of these transcoding circuits 52 to 54 which will be used, given the nature of the microprocessor 7 of the apparatus 1. The multiplexer 55 therefore receives two microprocessor type selection signals to enable a choice about which of the transcoding interfaces 52 to 54 is to be used.

The multiplexer 55 is furthermore connected, in one embodiment, to a mode detection circuit 56. The microprocessor 7 prompts the selection of the mode by the use of a signal admitted at an input CS (CHIP SELECT) of the interface 40. Periodically, or on request, the microprocessor 7 prompts the dispatch, on the address bus I/O, of the address of the status register 50. This address is decoded by an address decoder 57 of the control register 35 which contains the status register 50. The data bus of this control register 35 is then linked with a two-way interface 58 connected to the data bus of the microprocessor 7 by the multiplexer 51. Subsequently, the data elements read in the status register 50 and stored in the two-way interface 58 are transmitted to the microprocessor 7. This microprocessor 7 can then prompt the reading of the buffer memories 36 and 37 by first of all addressing these memories byte by byte and by reading the contents of the bytes received in the same way by means of a reception interface 59. The reception interface 59 contains circuits for the reading of the memories 36 and 37. It is driven by the control bus. This control bus is, at this time, driven by the microprocessor 7. At the end of reception, the microprocessor 7 prompts another mode change, returning control of the operation to the sequencer 43.

In transmission, the operation is somewhat similar. Initially, the microprocessor 7 takes control over the circuit of FIGS. 4a and 4b. By means of a port interface 60, connected to the data input bus of the transmission memory 38 and of the identification buffer memory 39, the microprocessor 7 loads these buffer memories respectively with data elements to be sent and with the identity of their addressee. This loading requires an alternating addressing of these memories 38 and 39 and an application of the commands sent by the microprocessor 7 on the control bus. When this is done, the microprocessor 7 returns control to the sequencer 43 by prompting, firstly, a change of mode and by furthermore sending it a command RS (REQUEST TO SEND). This command may furthermore take the form of the placing of the bit in a particular state in the control register 50. When the sequencer 43 resumes control, it will read the value of this bit and, depending on its state, it will launch the transmission sequence.

In these cases, the sequencer 43 triggers a transmission sequence that is formed by the following stages. In a first stage, the sequencer prompts the sending of a header consisting of a symbol and a start-of-frame signal SOF. The symbol and the start-of-frame signal are simply produced by a decoder circuit internal to the sequencer 43. This internal decoder receives the clock signal and delivers output levels as a function of its prior programming. This decoder which is a generator of symbols and of start-of-frame signals may be constituted by a programmable logic array, PLA, the inputs of which are connected to the outputs of a counter that counts the pulses of the clock signal. The sequencer 43 is itself designed according to the same principle.

In the same sequence, at the end of the dispatch of this start-of-frame signal, the sequencer 43 addresses the identification memory 38 and makes it send a parallel-series converter 42 the contents of the transmission RAM including the identification of the addressee. Normally, only the twelve bits of this identification are sent. The buffer memory 39 is used solely for reception, for the recognition of the stations that will address it. Naturally, the identifications of the addressees are not memorized in the memory 39 at the same places as the identifications pertaining to the microprocessor 7 and the apparatus 1. This could nevertheless be possible if, at each change of mode, the appropriate loading of the memory 39 is prompted. When the symbols have been sent, it is possible to send the signals previously stored in the buffer memory 38. This memory is then addressed by the sequencer circuit 43 and read gradually, and its contents are sent to the parallel-series transmission circuit 42. The bytes of the memory 38 are read and sent one after the other by using a transmission counter, the outputs of which are applied to the address inputs of the transmission memory 38. This transmission counter is synchronized with the converter 42. The output of the converter 42 is connected to a transmission part of the coupling circuit 5 which is not shown but is of a known type.

Given the fact that the reception part 41 which continues to remain connected to the coupling input 5 is capable of producing the collision, frame control and bit control signals at the same time as the transmission, this part 41 is used, at the time of the transmission, to program the status register 50. This register 50 becomes the status register of the transmitted signal. This programming is done by the sequencer 43. If necessary, it is possible to provide for two different registers 50, one used for the transmission and one used for the reception. In this case the sequencer 43, at the time of the writing of these results in the control register, will address the other register rather than the first one. The above-described operation of the bit control and collision control circuit has shown that it can work solely because it is connected to the transmission channel. Since the transmission output is connected to the transmission channel, the transmitted signal is therefore received simultaneously at the circuit 41 of the transmitter. The control is then immediate.

Each of the buffer memories 36 to 39 is shown in FIGS. 4a and 4b with an address multiplexer. Only the control logic of the memory 39 is shown with a multiplexer. The latter indication is used to show the alternating character of the approaches presented. Either there is only one control bus connecting the different control inputs of FIGS. 4a and 4b or there are two control buses for the circuits coming respectively from the microprocessor 7 and the sequencer 43. They are put locally into service, in the latter case with the mode signal.

With respect to the addressing, when the addressing is available to the microprocessor 7, it is done byte by byte at the initiative of this microprocessor. On the contrary, when it is independent of the microprocessor 7, it is preferably organized by means of counters triggered by the transmission part 42 or reception part 41. It is possible, however, to design a bigger sequencer 43 that is capable of also carrying out this sequencing operation.

Figure 5:
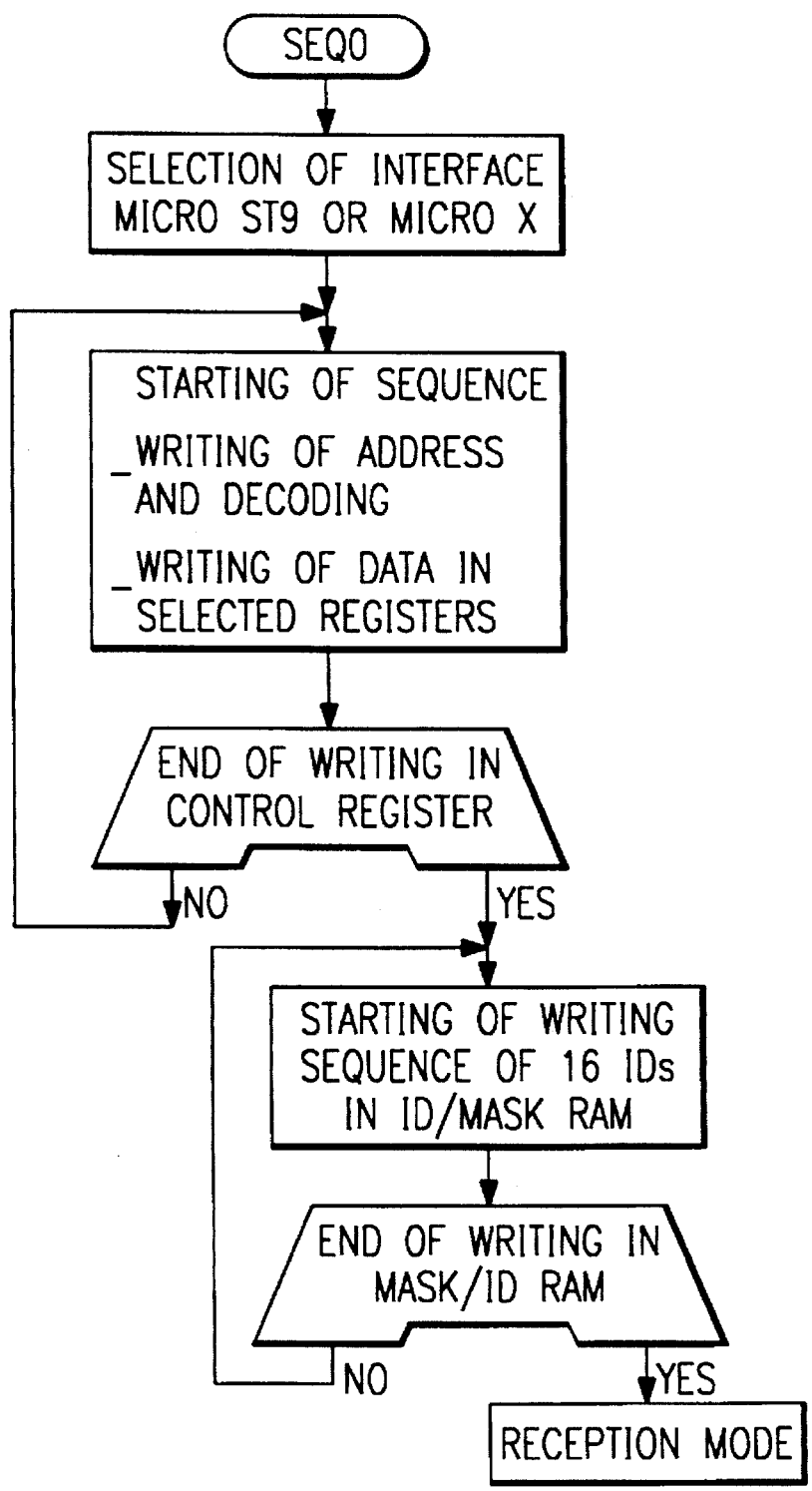
FIGS. 5, 6, 7 and 8 show flow charts of actions to be carried out during, respectively, a stage of initialization of the circuit and a stage of use in reception and in transmission as well as during the implementation of a particular mode of filtering of the transmitted signals.

FIG. 5 shows a flow chart of the stage of initialization of the device of the invention, when it is put under power. The first operation to be carried out relates to the interface selection enabling proper mutual understanding of the instructions of the microprocessor 7 with the mode of use proper to the circuit of FIGS. 4a and 4b. To this end, the different protocols that can be used are indicated to the user in a brochure that gives the correspondence between these protocols and two selection bits that are to be forced to a given value in order to put one of the useful interfaces 52 to 54 into operation.

When this has been done, at the initiative of the microprocessor 7, then firstly the masks 1 and 2 will be written in the parts 48 and 49 of the control register 35 and, secondly, a bit relating to the reception RR (REQUEST TO RECEIVE) at the level 1 will be written in the received status register 50. It is furthermore possible, in a speed configuration register and in a coding register, to indicate firstly the speed and, secondly, the type of coding (for example Manchester) used. These configuration registers modify the operation of the sequencer 43 of the clock. So long as this is not done, no other operation is permitted. When this is done, the writing of one of the identifications of the apparatus 1 in the identification buffer memory 39 is prompted at the initiative of the microprocessor 7, in passing through the interface 60. The procedure is continued with the other identifications if it is desired that several items of apparatus should be capable of addressing the microprocessor 7. When this is ended, the microprocessor 7 prompts the passage into reception mode: the circuit 6 is controlled by the sequencer 43 and is ready to react as soon as a start-of-frame signal is detected.

Figure 6:
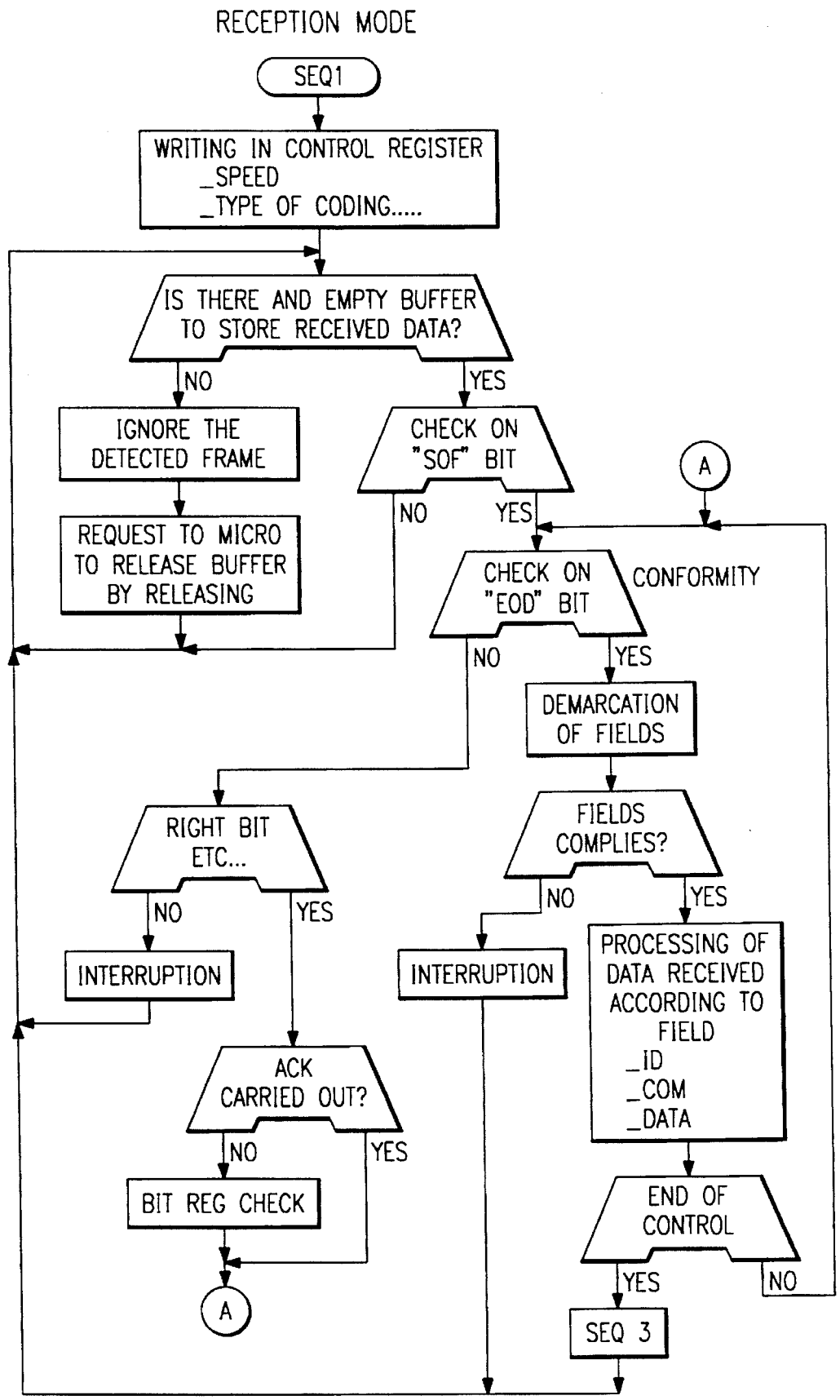

FIG. 6 shows what happens during the reception mode. Initially, whereas for example nothing is received, it is ascertained that the reception buffer memories 36 and 37 are empty so that data elements to be received can be stored therein. If this is not so, then the sequencer 43 is used to prompt the recording of an interruption in an interrupt register 61 and control is returned to the microprocessor 7 so that it releases the memories 36 and 37. When this is done, an scrutiny is carried out again in reception mode and permanently, to look for the appearance of a start-of-frame signal SOF. As soon as a message is received, firstly a bit control and a collision control and, secondly, a processing operation are carried out on the received signals. In this way, the identification signal and the transmitted data are received. At the end of the data reception, the appearance of the end-of-data signal EOD, FCS or EOF is monitored again. If the bit does not comply in terms of duration, a check will be made to see whether or not there has been a bit violation.

Figure 7:
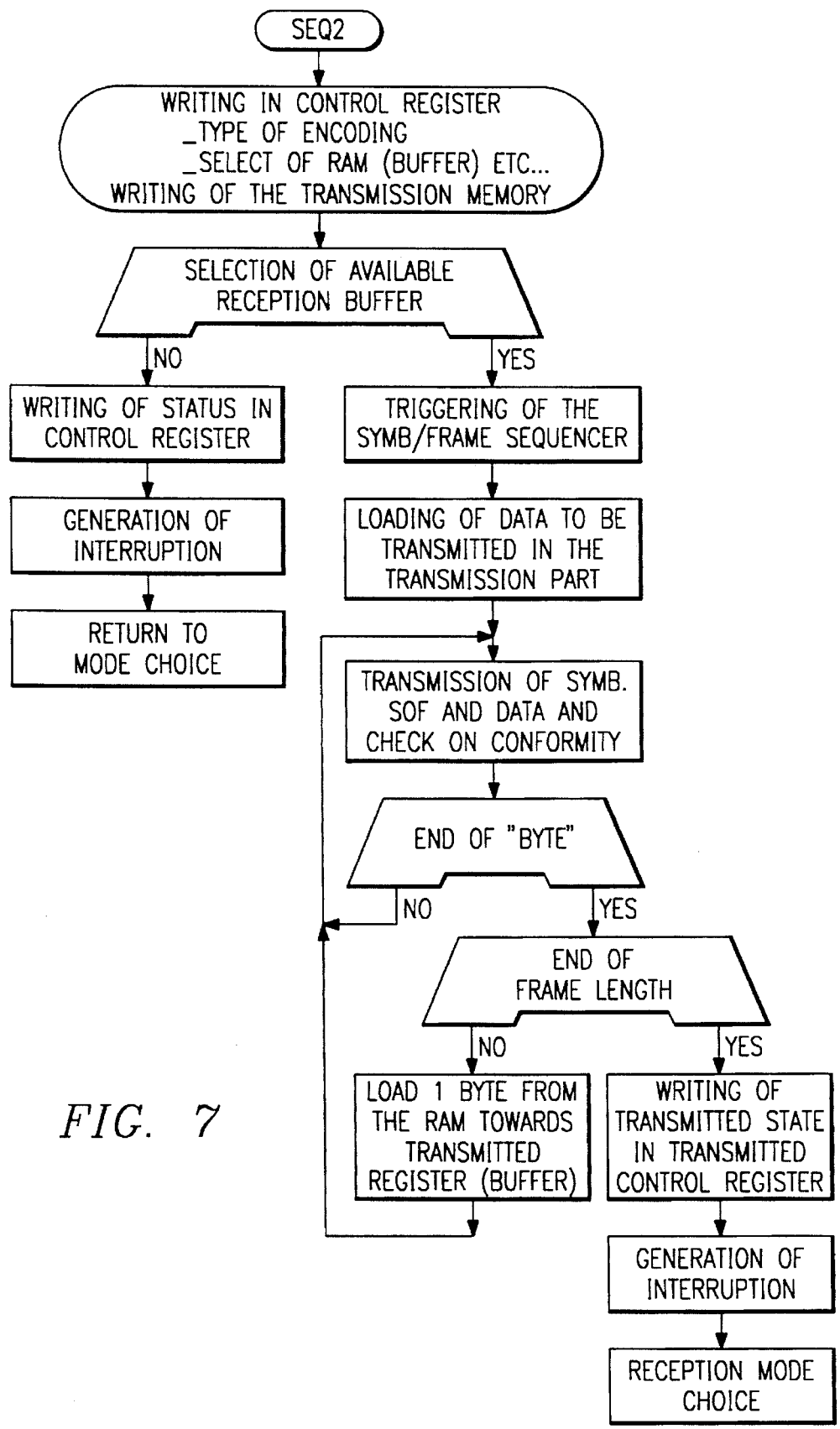

FIG. 7 shows the operations carried out in transmission mode. After the writing, as seen here above, in the transmission buffer memory, the writing is done in the control register by indicating the type of encoding chosen and a selection is made, in the reception memory, of at least one byte register which will be used for the storage of the frame transmitted. Indeed, reception is made at the same time as transmission. If a collision is detected or if a 1 has been sent and a 0 has been received or vice versa, it is written in this control register that there is a bit collision so that the microprocessor 7 can interpret the message or the reception.

If a reception register is available in the reception memory 36 or 37, the sequencer 43 is triggered so that it sends out the header constituted by the start of transmission symbols and by the signal SOF. Then, the data elements to be transmitted are loaded into the transmission part 42. At the end of the transmission of each byte, a check is made to see whether the end of this byte corresponds to the end of the frame sent. If this is not the case, the transmission is continued by taking a following byte from the transmission memory and sending it. If, on the contrary, this is the case, then a state of positive transmission is written in the status register transmitted. An interruption and the return to choice mode is then prompted.

Figure 8:
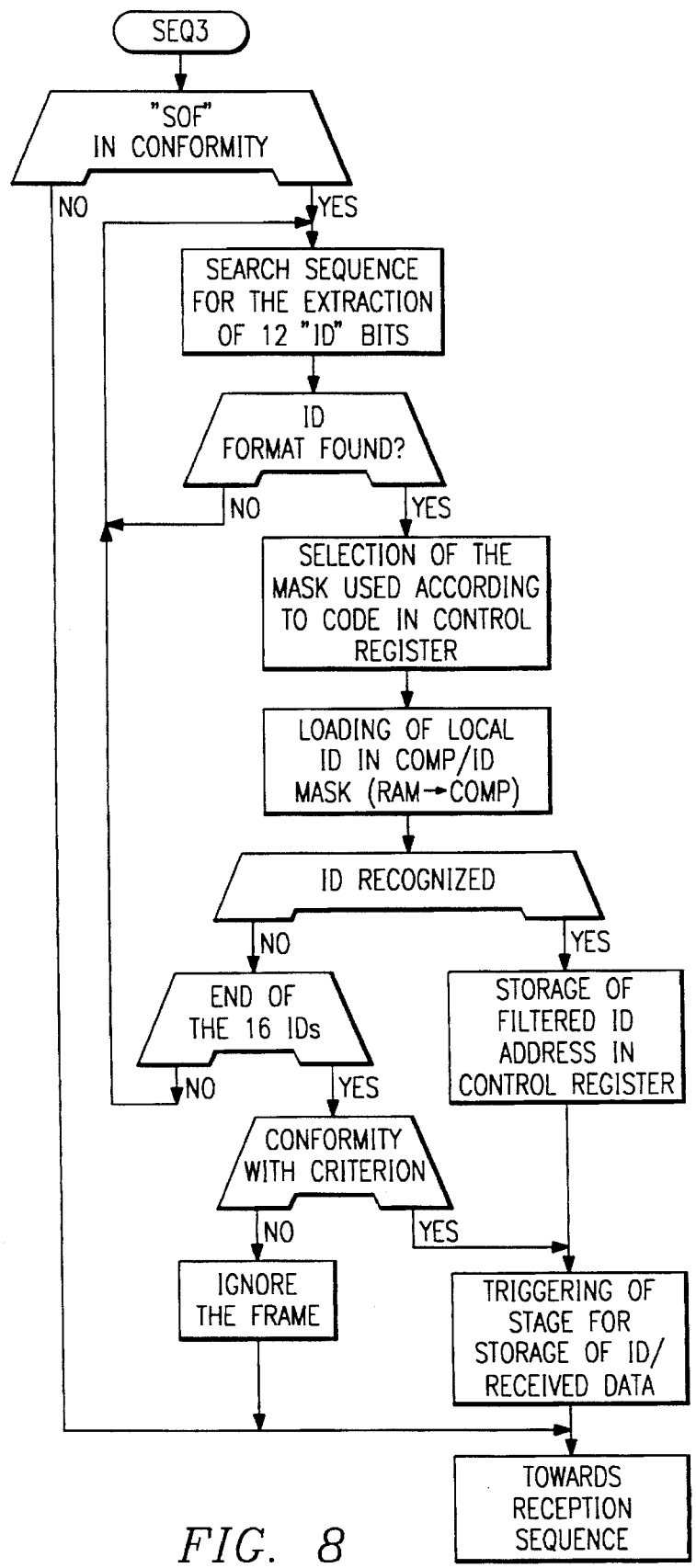

FIG. 8 shows the working of the masking operation proper to the invention. If the received start-of-frame signal is accurate, then the search for 12 identification bits is triggered in the buffer memory 39. As soon as an identification is found, a search is made for the mask associated with this identification (the last two bits of the 16-bit word containing the 12 identification bits). The local identification and the received identification are then loaded into the comparator 44 at the same time as, with the multiplexer 46, the filtration is permitted according to the decoded mask. If the received identification is not recognized, a search is made for another identification, stored thereafter in the memory 39. If, after scrutiny of the sixteen known identifications in the memory 39, there is none that corresponds, then the frame is ignored. When the identification is recognized, the address of the filtered identification is stored in the control register and the stage for storing the identification of the transmitter and the information elements received is triggered. Subsequently, the sequence of the reception operations is carried out.

What is claimed is:

1. A device for the connection of an apparatus to a signal transmission channel to transmit and receive signals, comprising:

a first coupling circuit to electrically couple the device to the signal transmission channel in reception and in transmission;

a second circuit electrically coupled to the first coupling circuit, said second circuit to process bits received or sent and to check conformity between the signals received or transmitted with a pre-set standard; and a third circuit electrically coupled to the second circuit and to the apparatus, said third circuit to manage transmitted signals as a function of a use proper to the apparatus; wherein the second circuit comprises a control register corresponding to a type of the signals transmitted or to be transmitted, and a buffer memory to receive the signals transmitted or to be transmitted, said buffer memory electrically coupled to said control register, said control register having a state;

the third circuit comprises a microprocessor carrying out, on the signals transmitted or to be transmitted, instructions loaded into a program memory of said microprocessor as a function of the state of said control register;

said device comprising, between the second and the third circuit, a fourth interface circuit to match the control protocol specific to a microprocessor of the third circuit with a control protocol of the second circuit, said fourth interface circuit having a multiplexer, said multiplexer programmable by two selection signals sent by said microprocessor of said third circuit.

2. The device according to claim 1, wherein:

the first and second circuits are mounted on a support, the third circuit mounted on an ancillary support.

3. The device according to either of claims 1 or 2, wherein the buffer memory comprises:

a reception zone of memory cells, said memory cells of said reception zone are programmed with data elements coming from the first circuit, said memory cells having contents, the contents of these memory cells being transmitted to the third circuit following instructions transmitted by said third circuit;

a transmission zone of memory cells, said memory cells of said transmission zone are programmed with data elements coming from the third circuit, the contents of said memory cells of said transmission zone being transmitted to the first circuit following instructions transmitted by the second circuit, and an identification zone of memory cells, said memory cells of said identification zone having contents, said memory cells of said identification zone are programmed, in initialization, with data elements of the third circuit, the contents of said memory cells of said identification zone being transmitted to the first circuit following instructions transmitted by this second circuit.

4. The device according to claims 1 or 2, comprising:

in the buffer memory, an identification zone of memory cells, said memory cells of said identification zone are programmed with data elements relating, firstly, to the identification of an addressee of the transmitted signals and, secondly, to a mode of filtering of these signals dictated for said addressee, in the control register comprising filtering registers programmed with filtering data elements, a fifth comparison circuit to compare said identification of an addressee of the transmitted signals with an identification received as a function of the filtering data elements that correspond to the filtering mode dictated for said addressee.

5. The device according to claims 1 or 2 comprising, in the control register, two parts:

a reception part having memory cells, said memory cells of said reception part are programmed with data elements produced by the second circuit, the contents of said memory cells of reception part transmitted to the third circuit following instructions transmitted by the third circuit, and a transmission part having memory cells, said memory cells having contents, said memory cells of said transmission part are programmed with data elements coming from the second or third circuit, the contents of said memory cells of said transmission part transmitted to the third circuit following instructions transmitted by said second and/or said third circuit.

6. The device according to claims 1 or 2, wherein said selection signals are enforced by the third circuit.

7. A device according to claims 1 or 2, wherein the second circuit comprises several registers.

8. The device according to claims 1 or 2, wherein the second circuit comprises a counter electrically coupled to a parallel to serial converter for synchronizing data reading address shifts in said buffer memory with transmitted signals read from said buffer memory while said second circuit is transmitting said signals.

9. The device according to claims 1 or 2, wherein the second circuit comprises a counter electrically coupled to a serial to parallel converter for synchronizing data writing address shifts in said buffer memory with received signals while said second circuit is receiving said signals.

10. The device of claim 3, further comprising:

in the buffer memory, an identification zone of memory cells, said memory cells of said identification zone are programmed with data elements relating, firstly, to the identification of an addressee of the transmitted signals and, secondly, to a mode of filtering of these signals dictated for said addressee, in the control register comprising filtering registers programmed with filtering data elements, a fifth comparison circuit to compare said identification of an addressee of the transmitted signals with an identification received as a function of the filtering data elements that correspond to the filtering mode dictated for said addressee.

11. The device of claim 3, wherein the control register further comprises a reception part having memory cells, said memory cells of said reception part are programmed with data elements produced by the second circuit, the contents of said memory cells of reception part transmitted to the third circuit following instructions transmitted by the third circuit, and a transmission part having memory cells, said memory cells having contents, said memory cells of said transmission part are programmed with data elements coming from the second or third circuit, the contents of said memory cells of said transmission part transmitted to the third circuit following instructions transmitted by said second and/or said third circuit.

12. The device of claim 4, wherein the control register further comprises a reception part having memory cells, said memory cells of said reception part are programmed with data elements produced by the second circuit, the contents of said memory cells of reception part transmitted to the third circuit following instructions transmitted by the third circuit, and a transmission part having memory cells, said memory cells having contents, said memory cells of said transmission part are programmed with data elements coming from the second or third circuit, the contents of said memory cells of said transmission part transmitted to the third circuit following instructions transmitted by said second and/or said third circuit.

13. The device of claim 3, wherein said selection signals are enforced by the third circuit.

14. The device of claim 4, wherein said selection signals are enforced by the third circuit.

15. The device of claim 5, wherein said selection signals are enforced by the third circuit.

16. The device of claim 6, wherein said selection signals are enforced by the third circuit.

17. The device according to 3, wherein the second circuit comprises several registers.

18. The device according to 4, wherein the second circuit comprises several registers.

19. The device according to 5, wherein the second circuit comprises several registers.

20. The device according to 6, wherein the second circuit comprises several registers.

21. The device according to 7, wherein the second circuit comprises several registers.

22. The device according to 3, wherein the second circuit comprises a counter electrically coupled to a parallel to serial converter for synchronizing data reading address shifts in said buffer memory with transmitted signals read from said buffer memory while said second circuit is transmitting said signals.

23. The device according to 4, wherein the second circuit comprises a counter electrically coupled to a parallel to serial converter for synchronizing data reading address shifts in said buffer memory with transmitted signals read from said buffer memory while said second circuit is transmitting said signals.

24. The device according to 5, wherein the second circuit comprises a counter electrically coupled to a parallel to serial converter for synchronizing data reading address shifts in said buffer memory with transmitted signals read from said buffer memory while said second circuit is transmitting said signals.

25. The device according to 6, wherein the second circuit comprises a counter electrically coupled to a parallel to serial converter for synchronizing data reading address shifts in said buffer memory with transmitted signals read from said buffer memory while said second circuit is transmitting said signals.

26. The device according to claim 7, wherein the second circuit comprises a counter electrically coupled to a parallel to serial converter for synchronizing data reading address shifts in said buffer memory with transmitted signals read from said buffer memory while said second circuit is transmitting said signals.

27. The device according to claim 3, wherein the second circuit comprises a counter electrically coupled to a serial to parallel converter for synchronizing data writing address shifts in said buffer memory with received signals while receiving said second circuit is receiving said signals.

28. The device according to claim 4, wherein the second circuit comprises a counter electrically coupled to a serial to parallel converter for synchronizing data writing address shifts in said buffer memory with received signals while receiving said second circuit is receiving said signals.

29. The device according to claim 5, wherein the second circuit comprises a counter electrically coupled to a serial to parallel converter for synchronizing data writing address shifts in said buffer memory with received signals while receiving said second circuit is receiving said signals.

30. The device according to claim 6, wherein the second circuit comprises a counter electrically coupled to a serial to parallel converter for synchronizing data writing address shifts in said buffer memory with received signals while receiving said second circuit is receiving said signals.

31. The device according to claim 7, wherein the second circuit comprises a counter electrically coupled to a serial to parallel converter for synchronizing data writing address shifts in said buffer memory with received signals while receiving said second circuit is receiving said signals.

32. The device according to claim 8, wherein the second circuit comprises a counter electrically coupled to a serial to parallel converter for synchronizing data writing address shifts in said buffer memory with received signals while receiving said second circuit is receiving said signals.

33. The device of claim 1, wherein said apparatus is selected from the group consisting of fire alarm systems, burglary alarm systems, electrical appliances, central heating installations, freezers, washing machines, and surveillance installations.

34. A transmission system to electrically link an electrical apparatus to a signal transmission channel to transmit and receive electrical signals, comprising:

coupling circuitry to electrically couple said electrical apparatus to said signal transmission channel;

matching circuitry electrically coupled to said coupling circuitry, said matching circuitry to compare said electrical signals received or transmitted with a pre-set standard, said matching circuitry comprising control register circuitry to control said electrical signals transmitted or to be transmitted and buffer memory circuitry to receive said electrical signals transmitted or to be transmitted, said buffer memory circuitry electrically coupled to said control register circuitry, said control register circuitry having a first electrical state, said matching circuitry having a first control protocol specific to said matching circuitry; and managing circuitry electrically coupled to said matching circuitry and to said electrical apparatus, said managing circuitry to selectively direct said transmitted signals to said electrical apparatus, said managing circuitry comprising a microprocessor, said microprocessor performing a series of operations on said electrical signals transmitted or to be transmitted in response to said first electrical state of said control register circuitry, said microprocessor having a second control protocol specific to said microprocessor; and interface circuitry electrically coupled to said matching circuitry and to said managing circuitry, said interface circuitry to match said second control protocol with said first control protocol, said interface circuitry having a multiplexer programmable by a plurality of selection signals, said multiplexer multiplexing said first control protocol with said second control protocol.

35. The system according to claim 34, wherein said coupling circuitry and said matching circuitry are mounted on a primary support and said managing circuitry are mounted on an ancillary support.

36. The system according to claim 34, wherein the buffer memory circuitry comprises a first plurality of memory cells to store first information, a second plurality of memory cells to store second information, and a third plurality of memory cells to store third information, said first plurality of memory cells programmable with said first information received by said buffer memory circuitry from said coupling circuitry, said first information selectively transmitted to said managing circuitry in response to instructions transmitted by said managing circuitry, said second plurality of memory cells programmable with second information received by said buffer memory circuitry from said managing circuitry, said second information transmitted to said coupling circuitry in response to instructions transmitted by said matching circuitry, said third plurality of memory cells programmable with information received from said managing circuitry, said third information transmitted to said coupling circuitry in response to instructions transmitted by said matching circuitry, said first information corresponds to information received, said second information corresponds to information transmitted, and said third information corresponds to identification information.

37. The system according to claim 34, wherein said buffer memory circuitry comprises first plurality of memory cells and a second plurality of memory cells, said first plurality of memory cells programmable with identification information corresponding to an identification of an addressee of said electrical signals, said second plurality of memory cells corresponding to a mode of filtering of said electrical signals dictated for said addressee and wherein said control register circuitry further comprising filtering registers programmed with filtering data elements and further comprising, a comparison circuit to compare said electrical signals corresponding to said identification of said addressee with an identification received with said filtering data elements that correspond to said filtering mode for said addressee.

38. The system according to claim 34, wherein said control register circuitry comprises a first plurality of control register memory cells and a second plurality of control register memory cells, said first plurality of control register memory cells programmed with data elements produced by said matching circuitry that are transmitted to said managing circuitry in response to instructions transmitted by said managing circuitry, said second plurality of control register memory cells programmed with data elements from said matching circuitry or said managing circuitry that are transmitted to said managing circuitry in response to instructions transmitted by said matching circuitry and/or said managing circuitry.

39. An electrical apparatus, comprising:

first circuitry to electrically couple a transmission system to a signal transmission channel in order to selectively transmit and receive electrical signals;

second circuitry electrically coupled to said first circuitry, said second circuitry to compare said electrical signals received or transmitted with a preselected standard signal, said second circuitry comprises control register to store control signals transmitted or to be transmitted and a buffer memory to receive the signals transmitted or to be transmitted, said buffer memory electrically coupled to said control register, said control register having a first electrical state, said second circuitry having a first control protocol specific to said second circuitry; said second circuitry to receive signals from a third circuitry, said third circuitry to selectively direct said electrical signals to said electrical apparatus, said third circuitry comprises a microprocessor, said microprocessor performing a series of operations on said electrical signals transmitted or to be transmitted in response to said first electrical state of said control register, said microprocessor having a second control protocol specific to said microprocessor; and interface circuitry electrically coupled to said second circuitry and to said third circuitry, said interface circuitry to match said second control protocol with said first control protocol, said interface circuitry having a multiplexer programmable by a plurality of selection signals, said multiplexer multiplexing said first control protocol with said second control protocol.

40. The electrical apparatus of claim 39, wherein the buffer memory comprises a first plurality of memory cells to store first information, a second plurality of memory cells to store second information, and a third plurality of memory cells to store third information, said first plurality of memory cells programmable with said first information received by said buffer memory from said coupling circuitry, said first information selectively transmitted to said third circuitry in response to instructions transmitted by said third circuitry, said second plurality of memory cells programmable with second information received by said buffer memory circuitry from said third circuitry, said second information transmitted to said coupling circuitry in response to instructions transmitted by said second circuitry, said third plurality of memory cells programmable with information received from said third circuitry, said third information transmitted to said coupling circuitry in response to instructions transmitted by said second circuitry, said first information corresponds to information received, said second information corresponds to information transmitted, and said third information corresponds to identification information.

41. The electrical apparatus of claim 39, wherein said buffer memory comprises first plurality of memory cells and a second plurality of memory cells, said first plurality of memory cells programmable with identification information corresponding to an identification of an addressee of said electrical signals, said second plurality of memory cells corresponding to a mode of filtering of said electrical signals dictated for said addressee and wherein said control register further comprising filtering registers programmed with filtering data elements and further comprising, comparison circuitry to compare said electrical signals corresponding to said identification of said addressee with an identification received with said filtering data elements that correspond to said filtering mode for said addressee.

42. The electrical apparatus of claim 39, wherein said control register comprises a first plurality of control register memory cells and a second plurality of control register memory cells, said first plurality of control register memory cells programmed with data elements produced by said second circuitry that are transmitted to said third circuitry in response to instructions transmitted by said third circuitry, said second plurality of control register memory cells programmed with data elements from said second circuitry or said third circuitry that are transmitted to said third circuitry in response to instructions transmitted by said second circuitry and/or said third circuitry.

\* \* \* \* \*